United States Patent
Seitz et al.

(10) Patent No.: US 10,281,255 B2
(45) Date of Patent: May 7, 2019

(54) METHOD FOR PERFORMING MEASUREMENTS USING A TEST ELEMENT IN A COORDINATE MEASURING MACHINE OR A MACHINE TOOL

(71) Applicant: Carl Zeiss Industrielle Messtechnik GmbH, Oberkochen (DE)

(72) Inventors: Dominik Seitz, Schwaebisch Gmuend (DE); Rainer Sagemueller, Aalen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 190 days.

(21) Appl. No.: 15/384,985

(22) Filed: Dec. 20, 2016

(65) Prior Publication Data

US 2017/0176164 A1 Jun. 22, 2017

(30) Foreign Application Priority Data

Dec. 21, 2015 (DE) .......................... 10 2015 226 387

(51) Int. Cl.
*G01B 5/24* (2006.01)
*G01B 5/008* (2006.01)
*G01B 21/04* (2006.01)

(52) U.S. Cl.
CPC ............... *G01B 5/24* (2013.01); *G01B 5/008* (2013.01); *G01B 21/04* (2013.01)

(58) Field of Classification Search
CPC .......... G01B 5/24; G01B 5/008; G01B 21/04; G01B 21/045

(Continued)

(56) References Cited

U.S. PATENT DOCUMENTS

| 4,369,581 | A | | 1/1983 | Lenz |
| 5,125,261 | A | * | 6/1992 | Powley ................ G01B 21/042 |
| | | | | 33/502 |

(Continued)

FOREIGN PATENT DOCUMENTS

DE 29 40 633 A1 4/1981
DE 41 34 690 C2 4/1993

(Continued)

OTHER PUBLICATIONS

R. Geckeler et al.; Calibration of angle encoders using transfer functions; 2006; pp. 2811-2818.

*Primary Examiner* — Christopher W Fulton
(74) *Attorney, Agent, or Firm* — Harness, Dickey & Pierce, P.L.C.

(57) ABSTRACT

A method for performing measurements using a test element, comprising:
arranging a test element in a measurement region of a coordinate-measuring apparatus, wherein the test element is arranged on a base of the coordinate-measuring apparatus or at/on a first, rotatable part of a rotating apparatus arranged within the measurement region, and wherein the test element is arranged in a first pose relative to the base or to the first part.
performing a measurement by incorporating the test element in the first pose,
arranging the test element with the movement device in a second pose on the base or on the first part using the movement device,
performing a measurement by incorporating the test element in the second pose.

19 Claims, 13 Drawing Sheets

Figure 1:
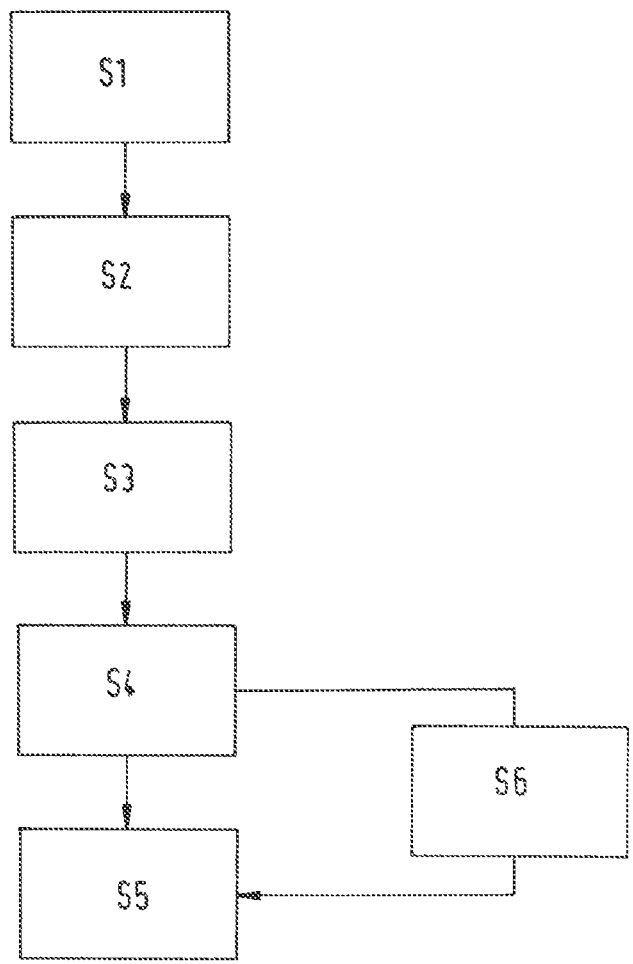

(58) Field of Classification Search
USPC .............................................. 33/502; 73/1.79
See application file for complete search history.

(56) References Cited

U.S. PATENT DOCUMENTS

| | | | | |
|---|---|---|---|---|
| 6,615,503 | B1* | 9/2003 | Nzomigni | G06T 7/70 |
| | | | | 33/502 |
| 9,772,181 | B2* | 9/2017 | Seitz | G01B 21/042 |
| 9,909,865 | B2* | 3/2018 | Sagemueller | G01B 21/04 |
| 2002/0152624 | A1 | 10/2002 | Asanuma | |
| 2002/0157449 | A1 | 10/2002 | Asanuma | |
| 2014/0259715 | A1* | 9/2014 | Engel | G01B 11/007 |
| | | | | 33/503 |
| 2015/0345940 | A1 | 12/2015 | Sagemueller et al. | |
| 2016/0195389 | A1* | 7/2016 | Sagemueller | G01B 21/045 |
| | | | | 33/503 |

FOREIGN PATENT DOCUMENTS

| | | |
|---|---|---|
| DE | 199 47 374 A1 | 5/2001 |
| DE | 601 26 032 T2 | 8/2007 |
| EP | 0 429 857 A1 | 6/1991 |
| EP | 1 178 282 A1 | 2/2002 |
| WO | 2014/108187 A1 | 7/2014 |

* cited by examiner

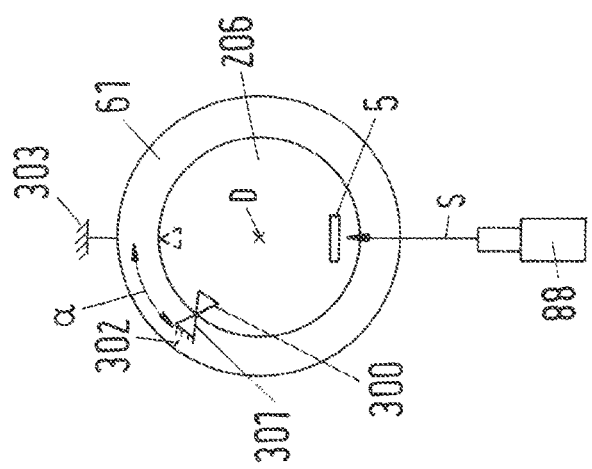
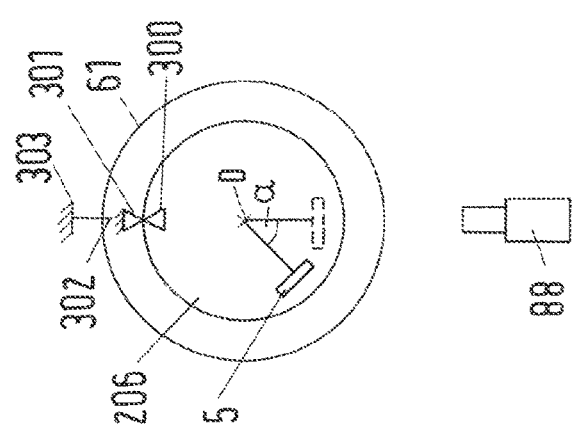
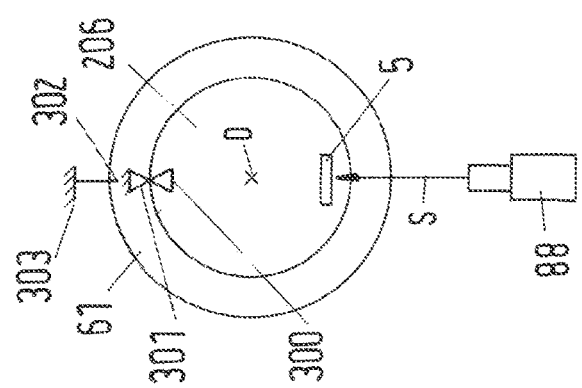

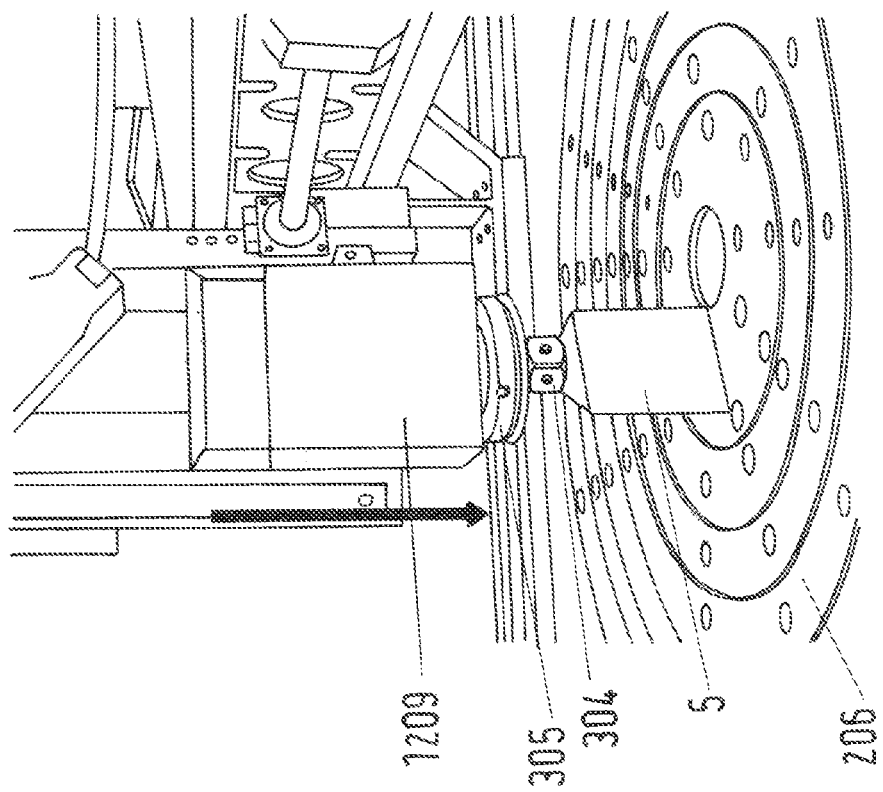

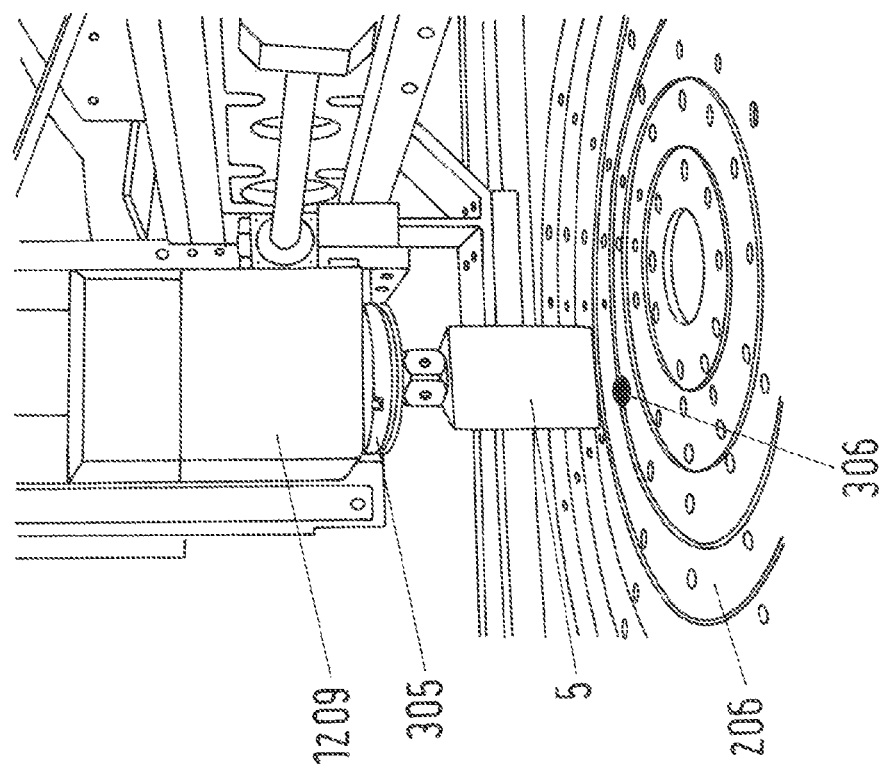

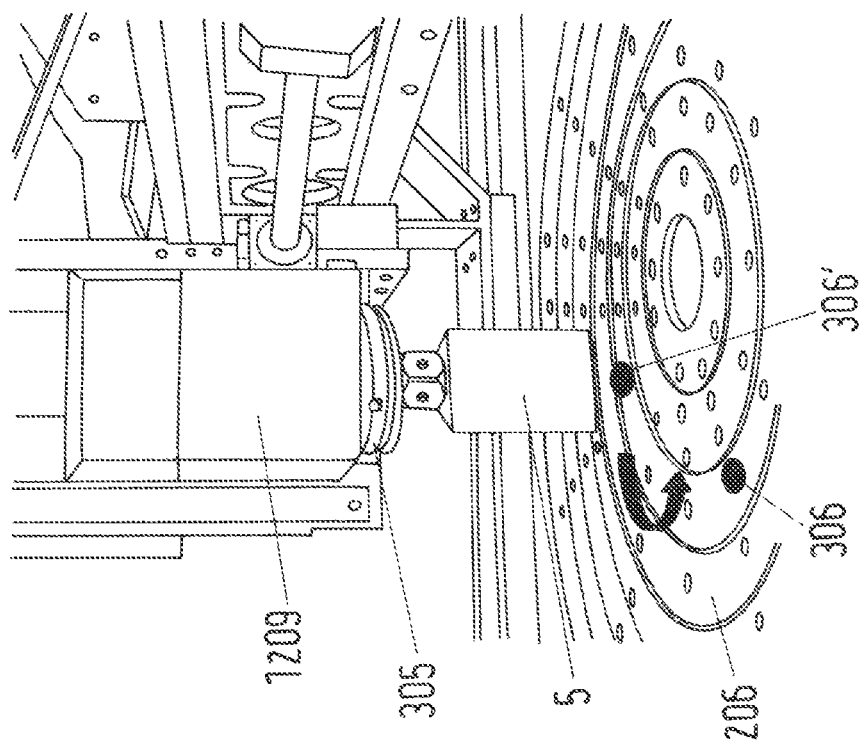

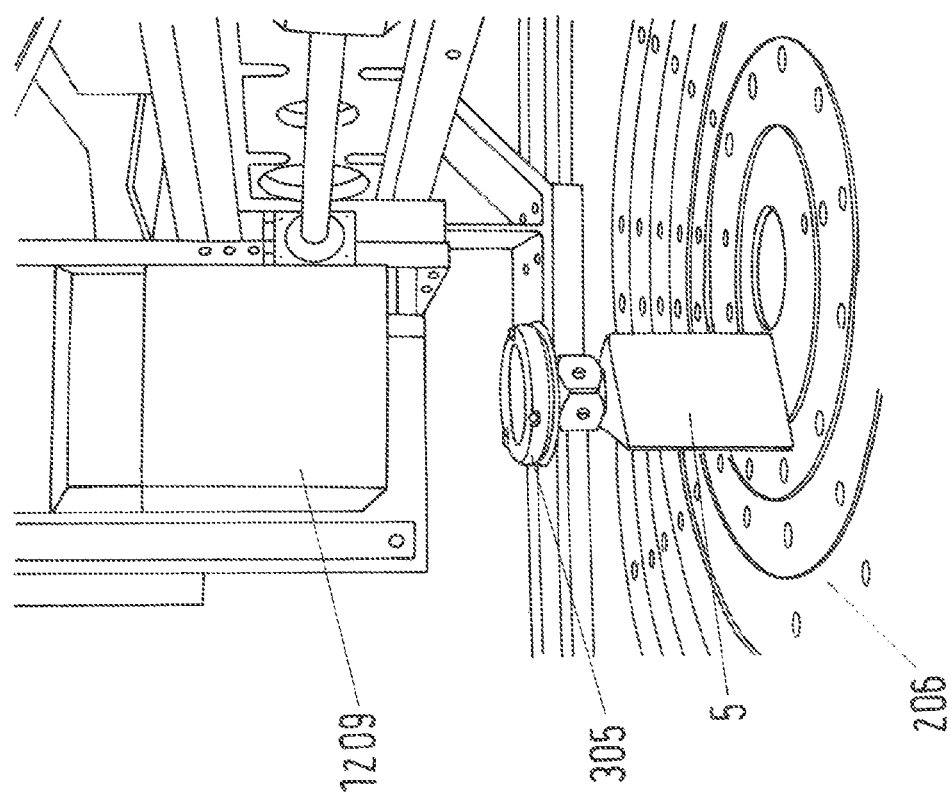

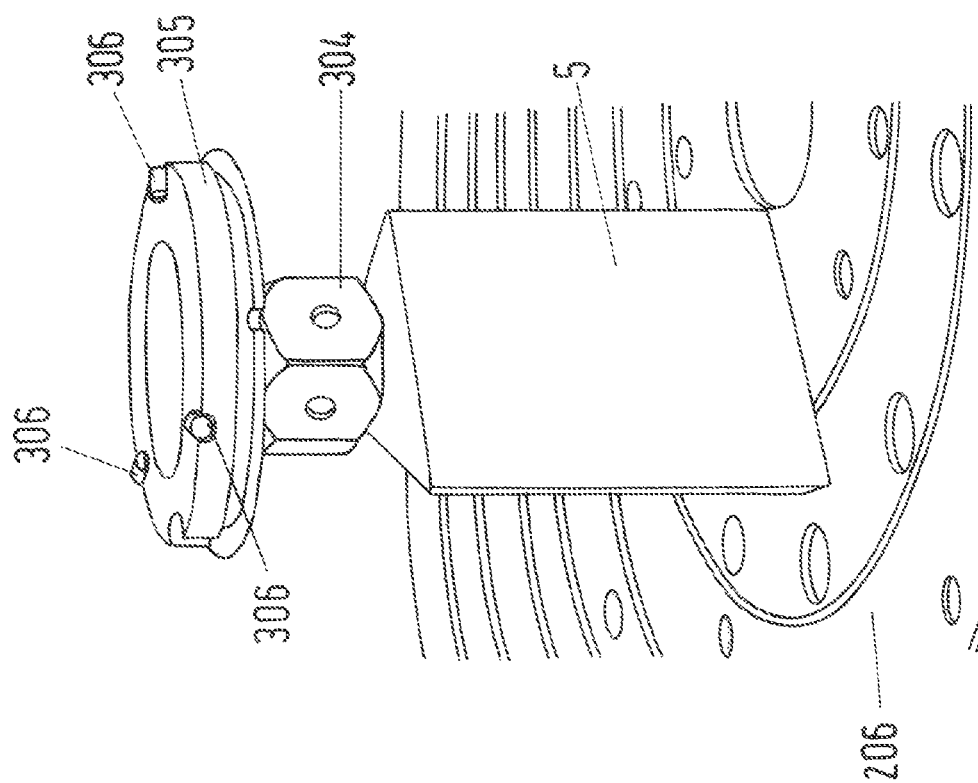

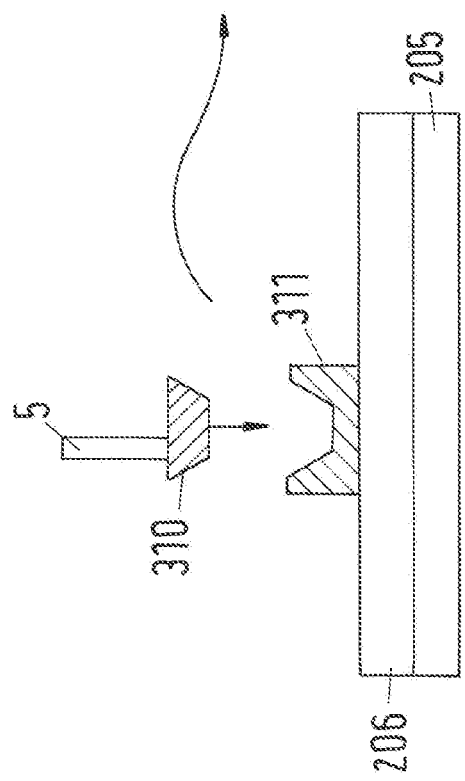

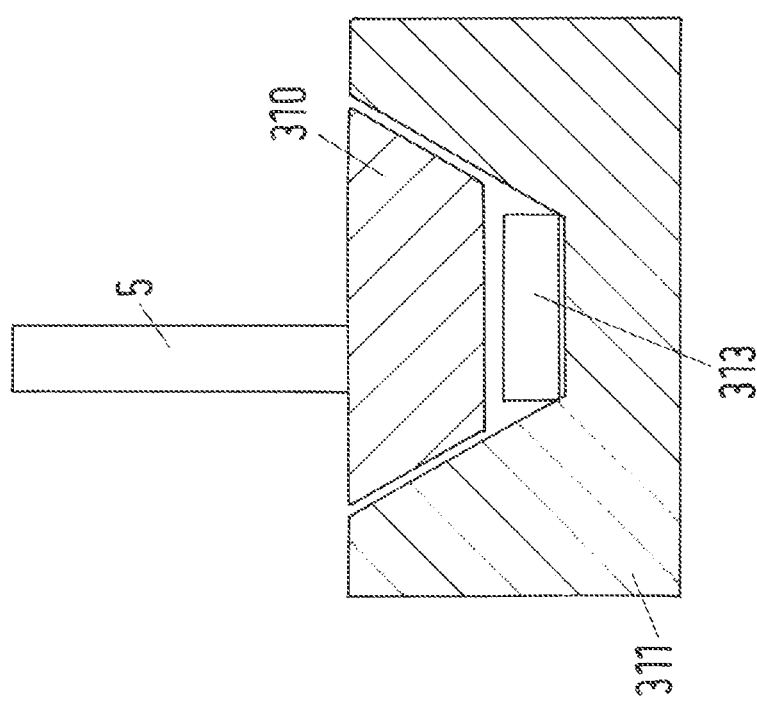

METHOD FOR PERFORMING MEASUREMENTS USING A TEST ELEMENT IN A COORDINATE MEASURING MACHINE OR A MACHINE TOOL

CROSS-REFERENCE TO RELATED APPLICATION

The present application claims priority under 35 U.S.C. § 119 to German national application, No. 10 2015 226 387.8, filed Dec. 21, 2015, the entire contents of which are incorporated herein by reference.

BACKGROUND OF THE INVENTION

The present invention relates to a method for performing measurements using a test element in a coordinate-measuring machine or machine tool, wherein the test element in the method is arranged in a different pose.

The accuracy requirements relating to the positioning of rotation axes, for example rotatable joints or rotating apparatuses, which are used in coordinate-measuring machines (CMM) or machine tools, frequently exceed the accuracies of the measuring systems of the rotation axes, for example of an angle-measuring system. It is therefore customary to capture the error of the measuring system or of a scale which is contained therein in a suitable fashion and to correct it downstream, for example during the measurement operation.

One possible variant for capturing a position error of a rotation axis is capturing the error using a mirror polygon in which angles between the mirror surfaces are exactly known. A mirror polygon of this type is an arrangement of mirror surfaces which are arranged around a common point of rotation. Known are for example polygons with 8 surfaces and up to 36 surfaces. The angles between the mirror surfaces are exactly known, since they were ascertained with high precision by certified organizations.

If a mentioned polygon is placed on a rotation axis for which the error of the angle-measuring system is intended to be ascertained, the angles of the polygon can be measured for example in an autocollimation telescope or another suitable angle-measuring machine. The deviations between predetermined angles of the calibration certificate and the angles indicated by the angle-measuring system are in that case errors of the angle-measuring system or of its scale itself.

However, this method has the following disadvantages:
- Limited calibration accuracy. The accuracy of the ascertainment of the error of the angle-measuring system increases as the number of mirror surfaces increases. The greater the number of mirror surfaces, the more accurately the calibration can be performed. However, polygons having more than 36 surfaces are not practical anymore.
- A calibrated polygon is difficult to procure, because generally long delivery times must be expected.
- High purchase costs for a calibrated polygon.
- The mirror surfaces are very sensitive to external influences, which makes handling difficult.

The application WO 2014/108187 A1 proposes to perform the calibration of a rotation axis to be tested, for example of a rotary table, against a calibrated rotating apparatus. In the process, both rotating apparatuses are stacked one on top of the other and rotated in opposite directions. A mirror is placed on the stack and used to capture the difference in rotation of both rotation axes using an autocollimation telescope and to thus ascertain the rotation error of the rotating apparatus to be tested. This method offers the advantage of freely selectable support locations. However, first the reference rotating apparatus needs to have been exactly calibrated. The disadvantage of this is that any residual errors in the reference rotating apparatus are not also taken into account but are interpreted as errors of the rotating apparatus that is to be tested. Furthermore, highly accurate calibration of the reference rotating apparatus is also a challenge which cannot be overcome with trivial means.

To solve the just mentioned problem, WO 2014/108187 A1 proposes to perform what is known as a reversal measurement. Instead of measuring the difference between angle measurement values between the reference rotating apparatus and the rotating apparatus that is to be tested with only one mirror, for example two mirrors, arranged opposite each other, are attached to the rotating apparatus to be tested and measured one after the other. A method of this type is described in detail in WO 2014/108187 A1 with reference to FIGS. 24a to 24d, 25 and 26. The disadvantage of this method is that other error components, such as a dual waviness of the error of the reference rotating apparatus, are not taken into consideration. For capturing this residual error of the reference rotating apparatus, four mirrors must be present, which requires a correspondingly greater outlay. To this end, that is to say for providing four or more mirror surfaces, a polygon could in turn be used. In the reversal measurement, a further rotation of the polygon can be effected via two rotating apparatuses which are stacked one on top of the other and rotate in opposite directions during the measurement. An exactly calibrated polygon in which the angles between the mirror surfaces are exactly known is not necessary herefor, because the polygon angles can be determined in the course of such a measurement and to do not need to be known in advance. However, other disadvantages of the use of a polygon remain, primarily the disadvantage of the limited number of support locations which is determined by the number of the mirror surfaces of the polygon. What is disadvantageous in such a reversal measurement using a polygon is that correction of errors of the reference rotating apparatus of an even higher order is not possible. For example, it is not possible to correct an error of a higher order, for example 30th ripple, using a polygon having 36 surfaces. The reason herefor is that the number of reversal measurements is determined by the number of mirror surfaces of the polygon. The number of possible reversal measurements is a result of the integer divisor of the mirror surfaces, so in the case of 36 surfaces: 2, 3, 4, 6, 9, 18, 36. Consequently, for each special case, such as a reversal measurement with a specific number of desired reversals, a dedicated polygon would have to be provided, which in terms of cost and outlay would simply not be acceptable. In addition, due to the fact that the reflective surface of the polygon must not be smaller than a specific size, the implementability of a polygon having more than 36 surfaces is not possible without increasing the dimensions of the polygon itself, but this would result in a polygon which is too large and/or too heavy.

It is the object of the invention to specify a solution for one or more of the above-stated problems.

SUMMARY OF THE INVENTION

According to one fundamental idea of the invention, a test element, in particular, a mirror or a polygon having a plurality of mirror surfaces, is moved, by hand or using an apparatus, into various poses within the coordinate-measuring machine or on a rotating apparatus. An apparatus is in particular a movement device which will be described below. In each of said poses, a measurement can be performed with the aid of, by incorporating, or using the test element. The measurement serves in particular for determining an error of the coordinate-measuring machine or of the rotating apparatus, in particular of a rotary table. The error is in particular a movement error or motion error of the coordinate-measuring machine or a rotation position error of the rotating apparatus, in particular an error of the rotation position ascertaining system with which the rotational position of part of the rotating apparatus is measurable.

According to one further idea of the invention, a polygon is replaced by a single mirror which is rotated and/or offset by specific angle and/or a specific distance, depending on each measurement, for example a reversal measurement. In this way, the problem of an expensive, highly accurate and calibrated polygon can be solved or such a polygon can be replaced. For each measurement, only a single mirror is used. In particular, after every reversal measurement, a mirror can be positioned to a different angular position. It is hereby possible to set the smallest possible angle changes and to perform any number of measurements in each new angle position and to thus exceed the number of measurements which are possible using a polygon having at most 36 surfaces. The use of a simple mirror offers a cost-effective option for replacing a highly accurate polygon having multiple surfaces.

According to a further idea of the invention, it is possible to use, aside from said mirror polygons and mirrors, other test bodies, such as for example probable calibration bodies.

According to yet another idea of the invention, the positioning of the test element can be performed using a movement device. The movement device can in particular be an external movement device or a movement device which is part of the coordinate-measuring apparatus. Particularly suitable is a movement device of a coordinate-measuring apparatus, in particular a movement device with which a measuring system of the coordinate-measuring apparatus is movable, in particular displaceable and/or rotatable. The movement device can in principle be any movable part or any combination of movable parts of a coordinate-measuring apparatus.

A measuring system of the coordinate-measuring apparatus is also referred to as a sensor. For this reason, the movement device with which a measuring system of the coordinate-measuring apparatus is movable is also referred to as a sensor movement device. Any part or any (sub-)component of a sensor movement device can be used according to the invention as a movement device. The movement device can be configured for a tactile sensor and/or an optical sensor. A tactile measuring system can comprise components such as a probe (also called measurement head) and a stylus system (also called probing system). The stylus system can comprise a stylus shaft and a probing element, also referred to as a stylus tip, for example a probing ball.

A sensor movement device is in particular a device for effecting translational and/or rotational movement of a sensor. A translational movement is made possible in particular in three degrees of freedom or spatial directions. A rotational movement is made possible in one or more degrees of freedom. A test element can be displaceable and/or rotational by way of a sensor movement device. A sensor movement device has, for example, a device for displacing a sensor along one or more spatial axes, preferably three spatial axes within a Cartesian coordinate system. A sensor movement device can furthermore comprise a device for the rotational movement of a sensor, in particular a rotatable joint. A sensor movement device has in particular a coupling means for coupling to a sensor or a probe. The sensor movement device can in particular be a movement device for an optical or a tactile sensor.

According to one idea of the invention, a test element can be brought from one pose into a different pose in a particularly targeted and particularly accurate manner using a sensor movement device. The term pose means: "Position and/or orientation", preferably "position and orientation". Instead of the term "pose" the alternative term "posture" may be used.

A sensor movement device can be configured such that a sensor for coordinate measurement may be coupled to it as an alternative to the test element or in addition to the test element. Accordingly, the sensor movement device can comprise coupling means for coupling to a sensor and/or for coupling to a test element.

In a special variant, coupling the test element to a probe of a coordinate-measuring apparatus can be effected. The probe can be coupled to the sensor movement system. The probe preferably has a coupling element to which a stylus system can be coupled and, as an alternative, a test element can be coupled. The probe can comprise, in addition to a coupling element for a stylus system, an additional coupling element for a test element.

Coupling to a probe is particularly advantageous if the latter has a coupling element for a stylus system. Alternatively to a stylus system, a test element can be coupled, for example having a coupling element which will be mentioned below. The probe can, as part of a sensor, be moved with the sensor movement system. It is thus possible for a test element which is coupled to a probe to be moved along with the sensor movement system. In this variant, a test element is thus coupled to the sensor movement system via a probe which (as part of a sensor) is coupled to the sensor movement device. The term "coupling" in the present invention means a direct or indirect connection of two components or parts. Advantageously, a determination can be made using the probe as to whether the test element upon arrangement is already placed on ground, since the probe has a sensor system which can be used herefor. A probe can be a measuring probe or a trigger probe, wherein a measuring probe is particularly advantageous for the purpose mentioned above.

In particular, the invention specifies a method for performing measurements with a test element, comprising:
  arranging a test element in a measurement region of a coordinate-measuring apparatus, in particular a coordinate-measuring machine (CMM), wherein the test element is arranged on a base of the coordinate-measuring apparatus or at/on a first, rotatable part of a rotating apparatus arranged within the measurement region, and wherein the test element is arranged in a first pose relative to the base or to the first part,
  performing a measurement by incorporating the test element in the first pose,
  arranging the test element in a second pose on the base or on the first part, in particular with or using a movement device,
  performing a measurement by incorporating the test element in the second pose, A measurement by incorporating the test element is in particular a measurement on the test element.

The first mentioned arranging of a test element in a measurement region of a coordinate-measuring apparatus can be effected with the movement device.

The movement device can be a separate movement device, in particular a lifting and lowering apparatus, which can move the test element, in particular lift it and lower it. The movement device can be an apparatus which is separate from the coordinate-measuring apparatus and which can be arranged in the measurement region of the coordinate-measuring apparatus. The movement device can be a device which is operated manually or by way of a machine. The movement device can be a device which is operated manually, in particular a device which is guided manually or by hand (the human hand alone, within the meaning of the invention, is not to be understood as being a "movement device"). The movement device can be a movement device which is operated by way of computer numeric control (CNC).

The movement device can comprise a gripping device with which the test element may be gripped, and/or comprise a coupling device with which the test element may be coupled to the movement device. A coupling device can be in particular mechanic and/or configured (electromagnetically).

In a special embodiment, the movement device is a sensor movement device, which has already been explained. The sensor movement device can be configured such that it can be used to move the test element alternatively to a sensor, or can be configured such that it can be used to move the test element in addition to a sensor, in particular at the same time as a sensor.

The method can include, as a step, coupling the test element to the movement device. This step is preferably performed before arranging the test element with the movement device in a second pose on the base or on the first part using the movement device. In a special embodiment, the test element is coupled to a probe of a sensor, as already mentioned. The test element can be coupled in particular to a coupling location which is provided or adapted per se or alternatively for coupling a stylus or stylus system. In this embodiment, it is possible to simply switch between a stylus and a test element.

The method can comprise, as a further step, preferably after arranging the test element in a second pose, decoupling of the test element from the movement device.

The steps of coupling and decoupling can be omitted, for example, if the movement device is of a nature such that the performance of a measurement by incorporating the test element in the second pose is not obstructed by the movement device, in particular if the test element is moved during the measurement. For example, the movement device can be configured flexibly such that a movement of the test element during a measurement is made possible without the movement device being actively moved.

If the movement device is a sensor movement device, the test element can be coupled to or decoupled from the sensor movement device in addition to a sensor which is already coupled to the sensor movement device. Alternatively, a sensor which was previously coupled to the sensor movement device or a stylus system which is coupled to a probe can be decoupled for performing the method steps in order that a test element is coupled to the sensor movement device instead and said method steps are performed. Subsequently, the sensor or the stylus system can be coupled to it again.

The coordinate-measuring apparatus is in particular a coordinate-measuring machine or a machine tool. In the case of a machine tool, the movement device is preferably a tool holder. Where a coordinate-measuring machine is mentioned below, the disclosure should also be read on a more generally defined coordinate-measuring apparatus.

The measurement by incorporating the test element of the method according to the invention is in particular a calibration measurement. The test element is in particular a test element for ascertaining calibration information. A calibration measurement is in particular a measurement for calibrating an angle-measuring system of a rotating apparatus.

The measurement by incorporating the test element can be performed with a measuring system or a sensor of a coordinate-measuring apparatus. To this end, once the test element is arranged in a different pose, a sensor or a stylus system can be coupled to a sensor movement device again. Measurement by incorporating the test element can be effected alternatively or additionally to a further device which is selected for example from at least one distance sensor, one autocollimator, one interferometer, or a combination of two or more thereof.

A rotating apparatus is in particular a rotary table, a rotatable joint (also called a swivel joint), and/or a rotation/swivel joint (also called articulating unit).

The first part of the rotating apparatus is for example a rotor, a rotary plate or a face plate.

The test element can be a gauge block, a mirror, a mirror polygon, a probable calibration body or a calibration template. According to the invention, a mirror is also referred to as a reflector. A mirror polygon can be a calibrated mirror polygon, in which angles between mirror surfaces are known with high accuracy, or can be a non-calibrated mirror polygon. A mirror is for example a plane mirror.

In one variant of the invention, the test element has a first coupling element for coupling to the movement device. The coupling element is in particular configured or adapted to be coupled to a probe or a sensor movement device. An exemplary coupling element has a three-point mounting. The three-point mounting can comprise in particular a ball pair triplet or a roll triplet. Due to a three-point mounting, a highly precise alignment of the test element in a second pose can be achieved.

The movement device can comprise a further (for example, according to the numbering in this invention, a fourth) coupling element what interacts with the first coupling element, for example a coupling element located on a probe.

A coupling element as mentioned can serve, in addition to the method according to the invention, for placing the test element at a storage location, for example a stylus system changes rack (also called stylus change magazine).

In one embodiment of the invention, the test element has a second coupling element with which the test element can be coupled to the base or the first part of the rotating apparatus. A repeatable, accurate and stable positioning of the test element can be achieved herewith.

The base or the first part of the rotating apparatus which is a rotatable part can comprise a third coupling element which interacts with the second coupling element which is provided on the test element. The second and the third coupling element can interact for example in a form-fitting manner. The second and the third coupling element can form a magnetic coupling.

In one embodiment, the test element has an identification feature. The identification feature is in particular an electronically readable identification feature, for example an ID chip. Such a feature can be read with a measuring system of the CMM. There is the possibility of determining during an automatic measurement whether the correct test element is being used. Consequently, the susceptibility to errors can be minimized and reliability can be increased.

In one embodiment of the method, an error of the rotary position ascertainment system of the rotating apparatus is ascertained by way of a measurement with incorporation of the test element or by way of a plurality of measurements with incorporation of the test element. In other words, the measurement by incorporating the test element is an error determination of the rotary position ascertainment system of the rotating apparatus or a measurement which serves for such an error determination or what is a step in such an error determination. In particular, an error of an angle-measuring system of a rotating apparatus is ascertained. For accurate performance of an exemplary method, reference is made to the attached examples.

In one embodiment of the method according to the invention, arranging the test element with the movement device in the second pose includes:
- lifting the test element, which is in the first pose, off the first part of the rotating apparatus using the movement device such that the test element and the first part are being separated from one another,
- rotating the first part of the rotating apparatus relative to the lifted-off test element by a rotation angle, and/or rotating and/or translationally moving the test element using the movement device,
- placing the test element onto the first part such that the test element is arranged on the first part and in the second pose relative to the first part.

A preferred test element in the method variant mentioned above is a mirror, in particular a plane mirror, or a mirror polygon. For example, a mirror polygon can be lifted, rotated using the movement device, and subsequently placed back.

In one special embodiment, the rotating apparatus, in particular a rotary table, is coupled to a reference rotating apparatus, and
- during the performance of the measurement by incorporating the test element, the rotating apparatus and the reference rotating apparatus are rotated in opposite directions,
- such that the pose of the test element in a machine coordinate system of the coordinate-measuring apparatus remains unchanged or is changed, and
- in the case of an unchanged pose of the test element, a rotary position value of a rotary position ascertainment system of the rotating apparatus and a rotary position value of a rotary position ascertainment system of the reference rotating apparatus are compared, and an error of the rotary position ascertainment system of the rotating apparatus is ascertained, or
- in the case of a changed pose of the test element, the change in the pose of the test element is ascertained, and thus the error of the rotary position ascertainment system of the rotating apparatus is ascertained.

This method variant is particularly suited for ascertaining a rotary position error of the rotary position ascertainment system of a rotating apparatus. This method variant is a development of the method described in WO 2014/108187 A1, which is incorporated herein in its entirety, for ascertaining an error of a rotary position ascertainment system. Reversal measurements described in this WO specification can be performed multiple times, wherein the mirror is brought into a different pose for each reversal measurement. In particular, a change in the pose of the test element or an unchanged pose of the test element can be ascertained during the performance of the measurement using an ascertainment device which interacts with the test element. Exemplary ascertainment devices are an autocollimator, an optical sensor of a coordinate-measuring machine, a tactile sensor of a coordinate-measuring machine, a laser interferometer, a distance sensor or any combination of one or more of them.

BRIEF DESCRIPTIONS OF THE DRAWINGS

Figure 2:
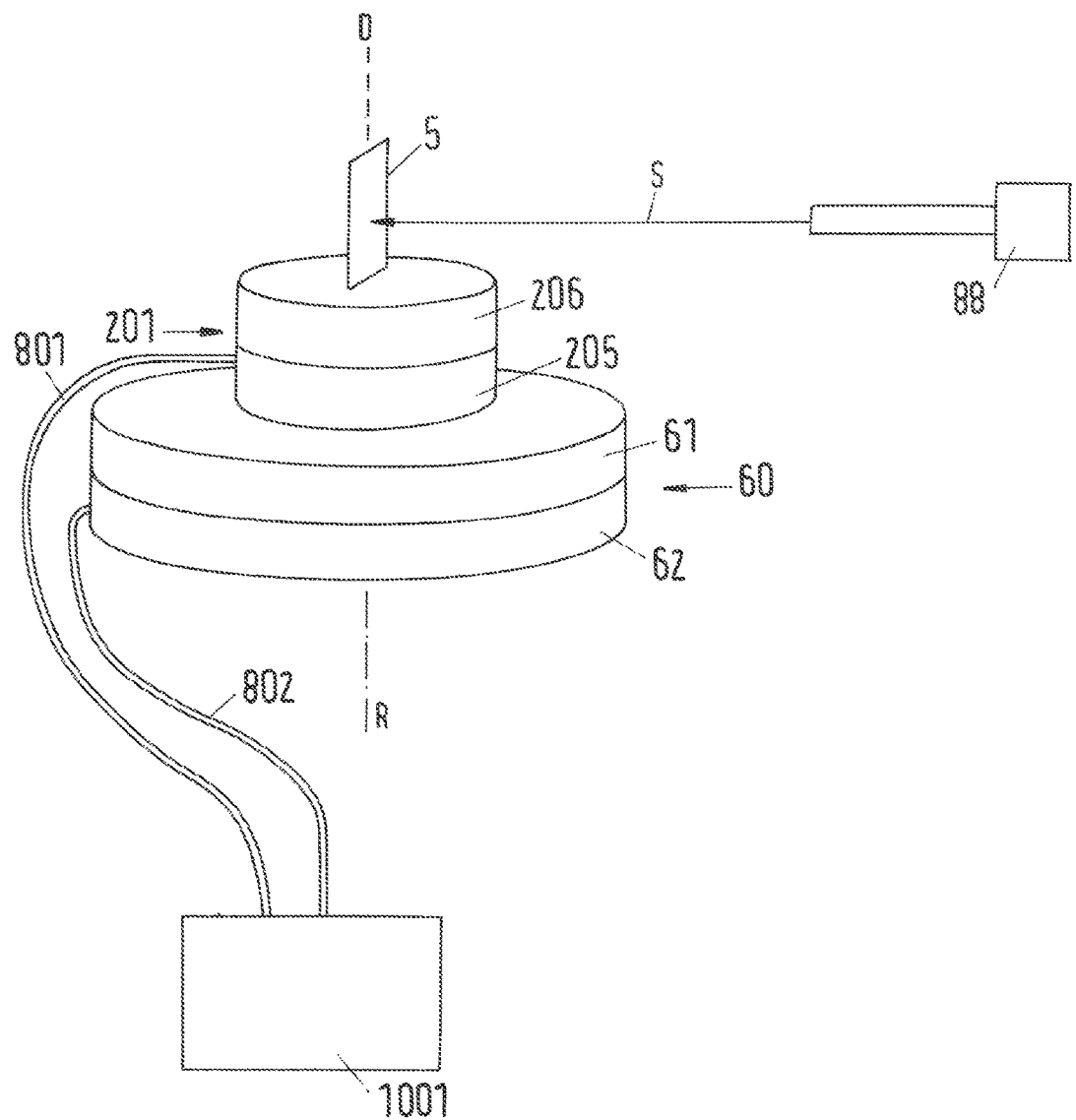
Figure 3:
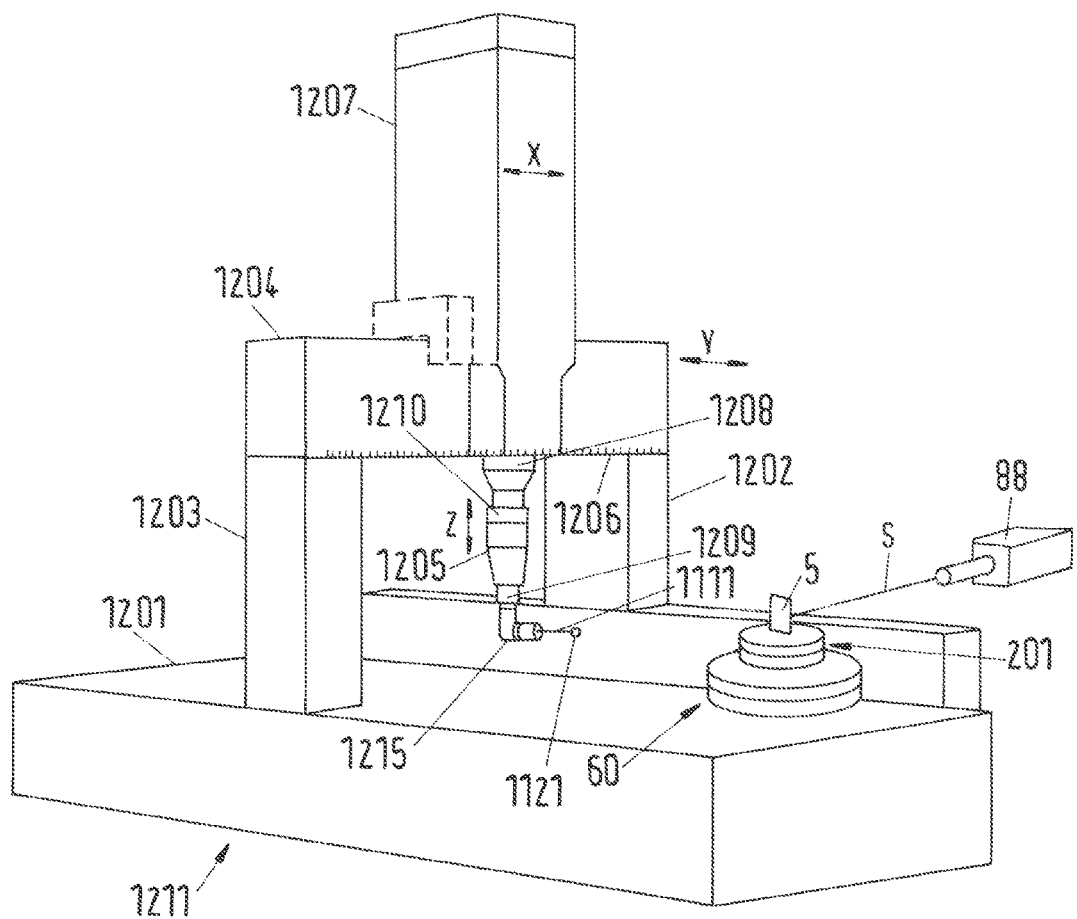
Figure 10A:
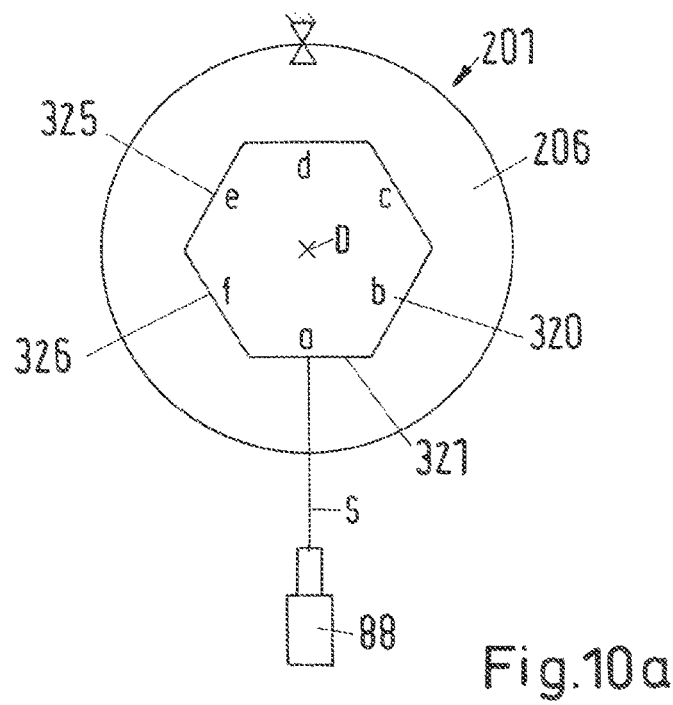

The invention is described below on the basis of exemplary embodiments. In the figures:

FIG. 1 shows a method sequence in schematic form with the designation for the method steps, FIG. 2 shows a method setup for performing a method according to the invention, FIG. 3 shows the method setup from FIG. 1 within a coordinate-measuring machine, FIGS. 4a-c show the method setup from FIG. 1 above, and the method steps coupling the test element to a sensor movement device of a coordinate measuring apparatus, and arranging the test element with the sensor movement device in a second pose on the first part of the rotating apparatus using the sensor movements device, FIGS. 5a-d show the method setup from FIG. 1 above, and the method steps coupling the test element to a sensor movement device of a coordinate measuring apparatus, and arranging the test element with the sensor movement device in a second pose on the first part of the rotating apparatus using the sensor movements device, FIGS. 6a-d show a further illustration and structural realization of the method sequence of FIGS. 5a-d, FIG. 7 shows an example of a test element which has a first coupling element for coupling to a sensor movement device of a coordinate-measuring machine, FIGS. 8a-c show examples of a coupling between test element and rotating apparatus using coupling elements, FIG. 9 shows an additional magnetic coupling between test element and rotating apparatus, FIGS. 10a and b show an example of a method according to the invention using a mirror polygon as a test element.

DETAILED DESCRIPTION OF THE PREFERRED EMBODIMENTS

FIG. 1 schematically illustrates a method sequence according to the invention:

Step S1: arranging a test element in a measurement region of a coordinate-measuring apparatus, wherein the test element is arranged on a base of the coordinate-measuring apparatus or at/on a first, rotatable part of a rotating apparatus arranged within the measurement region, and wherein the test element is arranged in a first pose relative to the base or to the first part.

Step S2: performing a measurement by incorporating the test element in the first pose.

Step S3: coupling the test element to a sensor movement device of the coordinate-measuring apparatus, in particular to a probe.

Step S4: arranging the test element with the sensor movement device in a second pose on the base or on the first part using the sensor movement device.

Step S5: performing a measurement by incorporating the test element in the second pose.

As an alternative to performing step S5 after step S4, it is possible for the test element in step S6 to previously be decoupled from the sensor movement device, in particular from the probe.

Said method steps S1, S2, S3, S4, S5 will be explained in more detail in the following examples.

One possible setup of a method according to the invention is shown in FIG. 2: A rotating apparatus 201 is placed on a reference rotating apparatus 60, in the present case a rotary table having a bottom part 62 and a rotary plate 61. The rotating apparatus 201 in this example is likewise a rotary table, with the intention being for the rotation angle error to be ascertained in the rotation angle measuring system thereof (not illustrated). The rotary table 201 has a bottom part 205 and a rotary plate 206. The bottom part 205 of the rotary table 201 is placed onto the rotary plate 61 of the reference rotating apparatus 60. Due to friction between the plate 61 and the bottom part 205 and due to the weight of the rotary table 201, the bottom part 205 is connected to the rotary plate 61 for conjoint rotation. The plate 61 of the reference rotary table 60 is rotatable relative to the bottom part 62 about the axis R of the reference rotating apparatus. The plate 206 of the rotary table 201 is rotatable relative to the bottom part 205 about the axis D. The axes D and R are arranged substantially coaxially.

The reference rotating apparatus is preferably a calibrated or self-calibrating rotating apparatus, in particular a self-calibrating rotary table. A self-calibrating rotating apparatus is disclosed in the document by Geckeler, R.; Fricke, A.; Elster, C.: "Calibration of angle encoders using transfer functions" from: Measurement Science and Technology, vol. 17 (2006). The changed rotary position or the change in the rotary position for the reference rotating apparatus can also be otherwise exactly known or settable, without using a rotary position measuring system, for example on the basis of a highly accurate mechanical actuating apparatus, such as for example a Hirth joint.

A mirror, which is orientated in the direction of an autocollimation telescope (ACT) 88, is arranged as a test element 5 on the plate 206 of the rotary table 201. The measurement beam S of the ACT 88 is incident on the surface of the mirror 5.

The order in which the reference rotating apparatus 60, the rotating apparatus 201, and the mirror 5, with associated ACT 88, are located with respect to one another is variable. It would also be conceivable for the ACT 88 to be placed on the rotating apparatus 201 and for the mirror 5 to be attached externally. In addition, for example for the calibration of a very large rotating apparatus 201, the reference rotating apparatus 60 could also be disposed on the rotating apparatus 201.

FIG. 2 furthermore shows an error ascertainment device 1001, which has for example a calculating unit, in particular a computer, which can undertake a calculation according to a specified program sequence. In addition to the error ascertainment, it is also possible to use the computer 1001 to transmit control signals to the stator 205 of the rotary table 201 and to the stator 62 of the reference rotary table 60, in particular signals for controlling the movements of the rotors 61 and 206. In addition to the error ascertainment, it is also possible to use the computer 1001 to transmit measurement signals from the stator 205 of the rotary table 201 and from the stator 62 of the reference rotary table 60, in particular measurement signals what provide information relating to the rotary position of the rotors 61 and 206. A cable 801 serves for signal transmission from the stator 205 of the rotary table 201 to the error ascertainment device 1001, and cable 802 serves for signal transmission from the stator 62 of the reference rotary table 60 to the error ascertainment device 1001. The cables 801 and 802 furthermore also serve for the transfer of energy. Instead of a cable 801 or 802, respectively, a plurality of cables can of course also be provided in each case, for example one for the signal transmission and one for the transfer of energy. Signal transmission and energy transfer devices to an ACT or to sensors, and further control or evaluation devices are not shown in this figure or the following figures. Also not illustrated are user interfaces on the computer 1001 (illustrated only schematically) or a display.

The performance of measurements using the test element is described below, which corresponds to the steps S2 or S5 (in a different pose of the test element than in S2) of FIG. 1. The intention is to ascertain the rotary position error of the rotary position ascertainment system of the rotary table 201.

The general sequence for ascertaining the rotary position error is as follows. In addition, reference is made in this respect to WO 2014/108187 A1:

The rotating apparatus has what is referred to as the second part 205 which is rotatable relative to the first part about a rotation axis D of the rotating apparatus 201, and in the method, a reference rotating apparatus 60 is used, which has two parts 61, 62 which are rotatable with respect one another, wherein one of the two parts is a third part 61, which is coupled to the second part 205 of the rotating apparatus 201 for conjoint rotation with respect to the rotation axis, and the other part of the two parts of the reference rotating apparatus is a fourth part 62, which is rotatable relative to the third part 61 about a rotation axis R of the reference rotating apparatus.

Performing measurements by incorporating the test element in the first and in the second pose then has in each case the following steps:

a) ascertaining a first rotary position of the rotating apparatus 201, wherein a first rotary position of the first part 206 relative to the second part 205 of the rotating apparatus is ascertained, b) ascertaining a first rotary position of a reference rotating apparatus 60, wherein a first rotary position of the third part 61 relative to the fourth part 62 is ascertained, c) varying the rotary position of the rotating apparatus 201 to a second rotary position of the rotating apparatus, ascertaining the second rotary position of the rotating apparatus using a rotary position ascertainment system of the rotating apparatus, varying the rotary position of the reference rotating apparatus 60 to a second rotary position of the reference rotating apparatus, ascertaining the second rotary position of the rotating apparatus, ascertaining a resulting rotary position, which has changed due to the varying of the rotary positions, of the first part 206 and of the fourth part 62 relative to one another, ascertaining the rotary position error of the rotary position ascertainment system from the changed resulting rotary position of the first part 206 and of the fourth part 62 relative to one another, and/or, alternatively or additionally to step c), d) varying the rotary position of the rotating apparatus 201 to a second rotary position of the rotating apparatus, and varying the rotary position of the reference rotating apparatus 60 to a second rotary position of the reference rotating apparatus 60, with the result that the resulting rotary position of the first part 206 and of the fourth part 62 has not changed, ascertaining the second rotary position of the rotating apparatus 201, ascertaining the second rotary position of the reference rotating apparatus 60, and ascertaining the rotary position error of the rotary position ascertainment system of the rotating apparatus from the rotary positions of the rotating apparatus 201 or the change in the rotary position of the rotating apparatus, and from the rotary positions of the reference rotating apparatus 60 or the change in the rotary position of the reference rotating apparatus.

Furthermore used is the ascertainment device 88, and the rotary positions of the first part 206 of the fourth part 62 relative to one another are ascertained using the test element 5, wherein the ascertainment device 88 is used to ascertain the rotary position or the changing rotary position of the test element relative to the ascertainment device 88.

The steps for error determination formulated more generally above will be explained in more detail below.

The plate 61 of the reference rotary table 60 is positioned relative to the bottom part 62 such that the rotary position ascertainment system of the reference rotary table 60 is at its reference mark or zero mark. The plate 206 of the rotary table 201 is likewise positioned relative to the bottom part 205 such that the rotary position ascertainment system of the rotary table 201 is at its reference mark or zero mark. Instead of the zero marks, any desired rotary position can be used as the first rotary position.

The rotary position angle of the mirror 5, which will be referred to as offset angle below, can now be ascertained with the ACT 88 or alternatively with another angle-measuring machine. The offset angle can, in a special case, also be zero, i.e. in this case, no offset would be present.

For the error ascertainment of the rotary position ascertainment system of the rotary table 201, first support locations for the error detection are defined. These can here be distributed irregularly or regularly over one or more revolutions of the plate 61 of the reference rotary table 60, wherein a preferred step width to be selected is the variant of integer devisors of 360°. As a result, errors due to a poorly set-up measuring system are not taken into account.

What is not decisive for the method is whether the plate 61 is rotated, when viewed from above, in the positive or the negative direction, i.e. both variants are equivalent. However, it can also be rotated in the positive and negative rotation directions to determine hysteresis effects.

For a negative rotation direction of the plate 61, the rotation angle positions (predetermined positions) to be taken in the case of a number of six steps for the reference axis would be for example 0°, −60°, −120°, −180°, −240° and −300°. However, the number can be increased almost as desired if for example short-periodic errors of the rotation axis to be calibrated are intended to be captured, or if aliasing effects are to be prevented.

In the variation of the rotary position of the plate 61 of the reference rotary table 60 and of the plate 206 of the rotary table, preferably one of the following positioning strategies is applied:

The test element in the setup of FIG. 2 is in a specific pose with respect to the plate 206 of the rotary table.

Various variants will be indicated in more detail below as to how measurements can be carried out using the test element 5 which serve for ascertaining the error of the rotation angle measuring system of the rotating apparatus. Also described will be specific steps S2 or S5 of the method according to FIG. 1. In supplementation, reference is also made to WO 2014/108187 A1 for explanatory purposes.

Variant 1:

For the respective support location, the settings are made as follows:

The plate 61, also referred to as a rotor, of the reference rotary table 60 is positioned at a negative specified predetermined position, here for example −60°. A changed rotary position of the reference rotating apparatus, i.e. the changed rotary position of the third part 61 (here the plate) and the fourth part 62 (here the bottom part 62, also referred to as a stator) relative to one another, is produced, as obtained by varying the rotary position of the reference rotary table 60.

The changed rotary position of the reference rotating apparatus is known exactly, because the angle-measuring system of the reference rotary table 60 is calibrated. This variable will be designated X below.

The plate 206 of the rotary table 201, also referred to as the rotor of the rotary table 201, is positioned at the negative value of the predetermined position of the reference table, in this case +60°, wherein the negative predetermined position is set using the rotary position ascertainment system of the rotary table 201 which is subject to errors. A changed rotary position of the rotating apparatus 201, i.e. the changed rotary position of the first part (here the plate 206) and the fourth part (here the bottom part 205, also referred to as a stator) relative to one another, is produced, as obtained by varying the rotary position of the rotary table 201.

The changed rotary position of the rotating apparatus is indicated by the rotary position ascertainment system, the error of which is intended to be determined. This variable will be designated Y below.

If the rotary position ascertainment system of the rotary table 201 is subject to errors, that is to say if the real rotation angle deviates from +60°, the result is that the relative rotary position of the first part 206 and of the fourth part 62 relative to one another is changed as compared to the starting state. In the starting state, the offset angle of the mirror 5 was ascertained with the ACT 88, as described above, wherein the offset angle in a special case can also be zero. The change in the relative rotary position of the first part 206 and of the fourth part 62 relative to one another, which is intended to be designated variable Z, corresponds to:

Z=angle which is ascertained by the ACT after varying the rotary positions−offset angle The rotary position error F (in this case the angle position error) of the rotary position ascertainment system of the rotary table 201 is ascertained using the error ascertainment device 1001.

The rotary position error in this example corresponds to: F=Z.

The rotary position error in the special variant 1 thus corresponds to the difference between the angle ascertained by the ACT 88 and the previously mentioned offset angle of the mirror. The nominal rotation angle (subject to errors) of the first part 206 and second part 205 with respect to one another (Y) and the nominal rotation angle of the third part 61 and the fourth part 62 relative to one another (X) add up to give zero. The nominal rotation angle is the indicated angle which is based on a pre-specification.

In another method variant, it is also possible for the nominal angles X and Y to be selected such that they do not add up to give zero, and for the rotary positions of the rotating apparatus and of the reference rotating apparatus to be effected such that the rotary position of the first part 206 and of the fourth part 62 relative to one another is changed as compared to the starting state, that is to say the ACT measures an angle deviation Z. The error F is then obtained from F=Z−(difference of the nominal angles X and Y)

Variant 2:

The plate 61 of the reference rotary table is positioned at a negative specified predetermined position, for example −60°. A changed rotary position of the reference rotating apparatus, i.e. the changed rotary position of the third part 61

(here the plate) and the fourth part 62 (here the bottom part) relative to one another, is produced, what is known exactly, because the angle-measuring system of the reference rotary table 60 is calibrated. This variable will be designated X below.

The plate 206 of the rotary table 201 is positioned such that the angle measured by the external ACT 88 exactly corresponds to the offset angle measured before the rotary positions are varied. This means that the rotary position of the mirror 5 relative to the ACT 88 is unchanged as compared to before (before the rotary positions were varied). This also means that the resulting rotary position of the first part 206 of the fourth part 62 is not changed or is substantially not changed. The angle value indicated by the ACT minus that of the previously determined offset in the ideal case thus gives zero. The ideal case is generally not achieved owing to measuring errors or setting inaccuracies, which is why in reality the angle value indicated by the ACT minus the previously determined offset in terms of the measuring error or the setting inaccuracy is somewhere around zero.

The angle Y, which is obtained by the above-described settings, is read on the rotary position ascertainment system. The setting of the rotary table produces a changed rotary position of the rotating apparatus, i.e. a changed rotary position of the first part (here the plate 206) and the second part (here the bottom part 205) relative to one another, indicated by the rotary position ascertainment system, the error (F) of which is intended to be determined. The angle position of the plate 206 of the rotary table 201 to be calibrated corresponds to:

$$Y = +60° + \text{rotary position error of the rotary position ascertainment system of the rotary table 201}$$

$$Y = -X + F$$

The rotary position error F (in this case the angle position error) of the rotary position ascertainment system of the rotary table 201 is ascertained using the error ascertainment device 1001. The rotary position error F corresponds to:

$$F = X + Y$$

Y here corresponds to the nominal angle value indicated by the measuring system which is subject to errors.

That is to say to the sum of the rotation angles that are indicated by the rotary position ascertainment system of the reference rotary table 60 and the rotary position ascertainment system of the rotary table 201. As opposed to variant 1, Z is not taken into account in the calculation, since the value is (approximately) zero.

Variant 3 of the Method:

The plate 206 of the rotary table 201 is positioned at a positive specified predetermined rotary position, for example +60°, indicated by the rotary position ascertainment system (subject to errors) of the rotary table 201. A changed rotary position of the rotating apparatus, i.e. a changed rotary position of the first part 206 (here the plate) and second part 205 (here the bottom part) relative to one another, is produced. This variable will be designated Y below.

The plate 61 of the reference rotary table 60 is positioned such that the angle measured by the external angle-measuring machine 88 exactly corresponds to the offset angle which was previously measured. This means that the rotary position of the mirror 5 relative to the ACT 88 is unchanged as compared to before (before the rotary positions were varied). This also means that the resulting rotary position of the first part 206 of the fourth part 62 is not changed.

The angle X, which is produced by the above-described settings, is read on the calibrated angle-measuring system of the reference rotary table 60. The setting of the reference rotary table results in a changed rotary position of the reference rotating apparatus 60, i.e. the changed rotary position of the third part (here the plate 61) and fourth part (here the bottom part 62) relative to one another, indicated by the calibrated angle-measuring system. The angle position of the plate 61 of the reference rotary table 60 corresponds to:

$$Y = -60° + \text{rotary position error of the rotary position ascertainment system of the rotary table 201}$$

$$= -Y + F$$

The rotary position error F (in this case the angle position error) of the rotary position ascertainment system of the rotary table 201 is ascertained using an error ascertainment device (not illustrated). The rotary position error corresponds to:

$$F = X + Y$$

that is to say to the sum of the rotation angles that are indicated by the rotary position ascertainment system of the reference rotary table 60 and the rotary position ascertainment system of the rotary table 201, as in the case of the above-described variant 2. As opposed to variant 1, Z is not taken into account in the calculation, since the value is zero.

In all variants, further angles can be set and other rotation directions can be selected in further method steps.

The variants 1-3 mentioned above by way of example differ as follows:

With respect to variant 2 and variant 3, variant 1 offers a speed advantage, since in the case of variants 2 and 3, the rotary position of the rotation axis to be calibrated or of the reference axis must be regulated to an external reference. Regulation to a rotary position of the own measuring system is generally faster. However, the use of variants 2 and 3 offers and independence on the accuracy of the external angle-measuring machine (ACT), since positioning to the same (possibly inaccurate) indicated angle is always effected. However, there is a dependence on the reproducibility of the ACT measuring system.

The coordinate measuring machine (CMM) 1211 with a portal design, depicted in FIG. 3, comprises a measurement table 1201, above which columns 1202, 1203 are arranged in a manner movable in the Y-direction of a Cartesian coordinate system. Together with a crossbeam 1204, the columns 1202, 1203 form a portal of the CMM 1211. At its opposite ends, the crossbeam 1204 is connected to the columns 1202 and 1203, respectively. Electric motors, which are not depicted in more detail, cause the linear movement of the columns 1202, 1203 in the Y-direction, along the Y movement axis. Here, for example, one electric motor is associated with each one of the two columns 1202, 1203. The crossbeam 1204 is combined with a cross slide 1207, which is movable, by way of air bearings, along the crossbeam 1204 in the X-direction of the Cartesian coordinate system. The current position of the cross slide 1207 relative to the crossbeam 1204 can be determined on the basis of a scale graduation 1206. The movement of the crossbeam 1204 in the X-direction, i.e. along the X movement axis, is driven by a further electric motor. A ram (also: quill) 1208, which is movable in the vertical direction, is mounted on the cross slide 1207 and connected at the lower end thereof to a measuring head 1209 by way of a mounting apparatus 1210 and a rotary device 1205.

Coupled to the measuring head 1209 is the angled rotatable joint 1215, on which the stylus shaft 1111 and the stylus tip, which is a probing ball 1121, as a probing element are attached. The measuring head 1209, the rotatable joint 1215, the stylus shaft 1111 and the probing ball 1121 together form a tactile sensor of the CMM 1211.

A sensor movement device is formed by the movable parts 1202, 1203, 1204, 1205, 1207, 1208, 1210 explained above. A sensor movement device is designated such because coupled hereto, here to the component 1205, and moved therewith is the sensor having the components measuring head 1209, rotatable joint 1215, stylus shaft 1111 and probing ball 1121.

The coupling of the sensor thereto is effected via the measuring head 1209 or between the measuring head 1209 and the part 1205.

Using the sensor movement device, the sensor is movable in the indicated spatial directions X, Y, Z and additionally rotatable. The measuring head 1209 can be moved relative to the cross slide 1207 in the Z-direction, along the Z movement axis, of the Cartesian coordinate system, by way of being driven by a further electric motor. The measuring head 1209 can be brought into virtually any position in the region below the crossbeam 1204 by way of the electric motors of the CMM. Furthermore, the rotating apparatus 1205 can rotate the rotatable joint 1215 about the Z axis such that the stylus shaft 1111 can be aligned in different directions. Not illustrated is a controller which controls the movement of the movable parts of the CMM along the movement axes. The controller is configured for performing one or more of the steps explained in the general part of the description.

Arranged on the measurement table 1201 of the coordinate-measuring machine 1211 is the setup, shown in FIG. 2, of reference rotary table 60 and rotary table 201. Arranged next to the CMM 1211 is the ACT 88, the measurement beam S of which is directed onto the mirror 5.

The test element 5 can in principle be coupled to any part of the movement device and moved therewith, which is a general principle of the invention. The test element 5 can in principle be coupled to various locations of a movement device of the CMM 1211. In one variant, the test element 5 can be coupled directly to the above-designated sensor movement device made up of the parts 1202, 1203, 1204, 1205, 1207, 1208, 1210, wherein in this example coupling to the part 1205 is effected. In another variant, the test element 5 can be coupled to the measuring head 1209, alternatively to the stylus system which is formed of the parts 1215, 1111 and 1121. This variant is shown in FIGS. 5a-5c and 6a-6d. Here, the test element 5 is coupled to the sensor movement device via the measuring head 1209, which in turn is coupled to the sensor movement device.

In FIGS. 4a to 4c, the repositioning of the mirror 5 from a first into a second pose with respect to the rotary table 206 is illustrated. The setup of FIG. 2 is shown from above, wherein the mirror 5, as opposed to FIG. 2, is not positioned on the rotation axis D, but eccentrically thereto.

The method steps illustrated in FIGS. 4a to 4c correspond to the method steps S3 and S4 of the method scheme from FIG. 1.

FIG. 4a illustrates the situation after performance of the above-explained method step S2, in which a rotary position error was ascertained. The position illustrated in FIG. 4a is also referred to as the "end of the reversal measurement". The situation illustrated in FIG. 4a can illustrate the starting situation or the end situation after a measurement cycle, which was explained above with respect to the ascertainment of the rotary position error of the rotary table 201. The triangle symbols 300, 301 show the relative position of the rotary table rotor 206 (symbol 300) to the rotary table stator 205 (symbol 301). The line symbols 302, 303 show the relative position of the reference rotary table rotor 61 to the reference rotary table stator 62. Both the rotor 206 of the rotary table 201 and the rotor 61 of the reference rotary table are at the zero position of the respective angle-measuring systems.

In FIG. 4b, a changed situation is established. First, the mirror 5 is coupled to the measuring head 1209 of the coordinate-measuring machine 1211, which is not explicitly shown here. Previously, the tactile sensor 1215 is decoupled from the measuring head 1209 so as to have this coupling location available. The mirror 5 is lifted in the z-direction by way of displacement of the ram 1208 in the Z direction, and displaced in the X and/or Y direction by moving the portal 1204 in the Y direction and/or moving the cross slide 1207 in the Z direction. Furthermore, the mirror 5 is rotated by way of rotating the measuring head 1209 by an angle value. The coupling of the mirror 5 to the measuring head 1209 will be explained in more detail below.

The mirror 5 is placed on the rotor 206 in the position shown in FIG. 4b and decoupled from the measuring head 1209. As a result, the mirror 5 was displaced on the rotor 206 by the angle $\alpha$. The angle $\alpha$ preferably corresponds to a value of 360°/n, with n being an integer and indicates the number of reversal measurements to be carried out in total. The mirror 5 can thus be displaced by an angle $\alpha$ until the pose of the mirror 5 illustrated in FIG. 4a, with respect to the rotor 206 or its reference point 300, is restored.

A deviation of the angle positioning from a predetermined position should be less than a 20th of the measurement range of the measuring machine, in this case the ACT 88.

In FIG. 4b, the mirror 5 is displaced such that the measurement beam S of the ACT 88 was left. Therefore, the situation illustrated in FIG. 4c is restored in order to rotate the mirror 5 back into the measurement beam S. The rotor 61 of the reference rotary table 60 is rotated counterclockwise about the angle $\alpha$ such that the rotor 61 is rotated with respect to the zero mark 303 of the angle positioning measuring system of the reference rotary table 60 by the angle $\alpha$. In the case of the rotary table 201, the angle-measuring system of which is to be tested or calibrated, the rotor 206 is at the zero position. In the illustrated, modified rotary position of the reference rotary table 60, a reference mark or zero mark of the rotary position ascertainment system of the reference rotary table 60 can be set as a starting point for the measurement, or the newly set angle $\alpha$ of the reference rotary table 60 is noted as an offset angle of the reference rotary table and taken into account. Starting from the rotary position illustrated in FIG. 4c, the error of the rotary position ascertainment system of the rotary table 201 can be ascertained again, which in the method sequence of FIG. 1 corresponds to step S5. Step S5, which in principle corresponds to a plurality of individual steps, is the ascertainment of the rotary position error of the rotary table 201 and is analogously performed as illustrated above, except for starting from a different starting position of the reference rotary table and starting from a different pose of the mirror 5 with respect to the rotor 206 of the rotary table 201. For further explanation, reference is also made to WO 2014/108187, in particular, the FIGS. 24a, 24b, 24c and 24d therein, and to the explanations in this respect in the figure description of WO 2014/108187. In contrast to the cited WO specification, it is possible to establish not only two reversal positions which differ by 180°, but the angle $\alpha$ is settable as desired, wherein the angle α should preferably correspond to a value of 360°/n. Furthermore, the angle α is settable to a value which is arbitrarily small, since the mirror 5 is settable with a corresponding fineness by the sensor movement system of the CMM 1211 (see FIG. 3). In particular, the angle α is settable to a value which is smaller than 360°/12. A value of 360°/12 is the minimum value which can be achieved with a mirror polygon, since a mirror polygon having more than 12 surfaces is not available or not producible in an economical manner. By selecting a small angle α or a large value of n (if α=360°/n), a high number of reversal measurements can be made possible and thus a more significant reduction of the errors of the reference rotary table 60 can be achieved.

After a new ascertainment of the rotary position error is performed, starting from the position shown in FIG. 4c, the reflector 5 can again be offset by an angle α, as shown in FIG. 4b. With respect to the position Mark 300, the mirror 5 would then be offset by twice α, or after realignment with the measurement beam S, the rotor 61 of the reference rotary table 60 would be rotated by twice α. Starting from such a position, a further measurement, referred to as a second reversal, of the angle position error of the rotary table 201 can be effected. This principle can be continued until a number of n reversal measurements is obtained. By a number of reversal measurements which is as high as possible, that is to say by the smallest possible values of the angle α, the residual errors of the reference rotary table 60 are effectively eliminated. To this end, reference is also made to WO 2014/108187 and the explanations with respect to FIGS. 25 and 26, in which the principle of the reversal measurement is illustrated again.

Figure 5D:
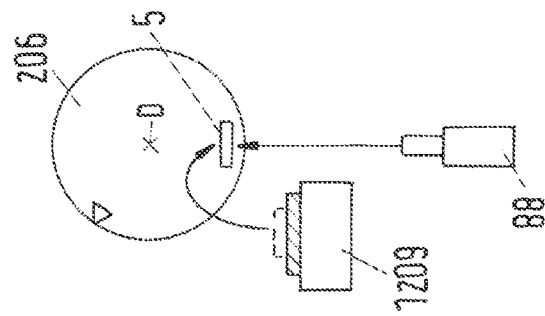
Figure 5C:
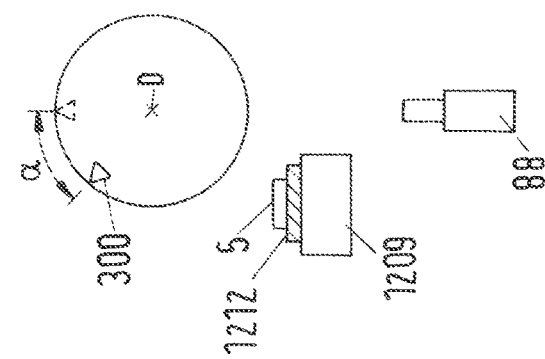
Figure 5B:
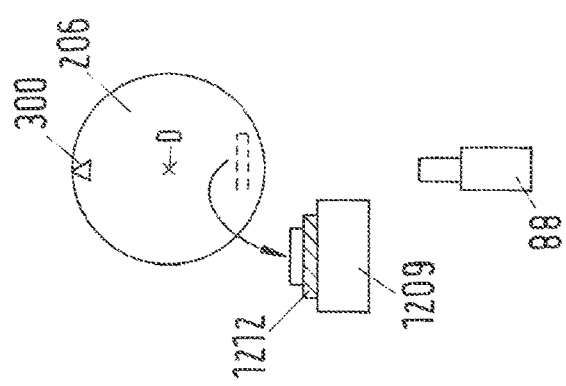
Figure 5A:
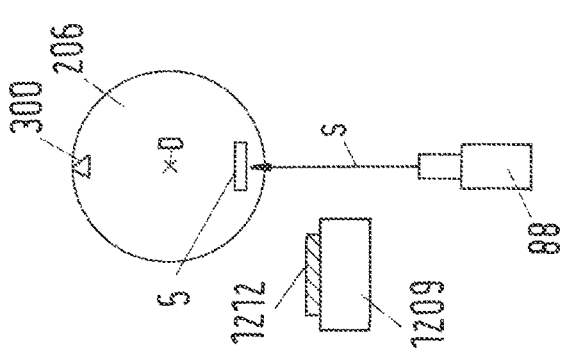

FIGS. 5a to 5d show a further special method of how the pose of the test element 5 on the rotatable part 206 of the rotating apparatus 201 can be changed. FIG. 5a illustrates a first pose of the mirror 5 on the rotary plate 206, and FIG. 5b illustrates a second pose with respect to the rotary plate 206. With respect to the reference mark 300, both the position and the orientation of the mirror 5 on the rotary plate 206 are changed. The pose change is shown analogously to FIG. 4, wherein FIG. 4a illustrates a first pose and FIG. 4c illustrates a second pose of the mirror 5 onto the rotary plate 206. However, the type of repositioning of the mirror 5 is a different one.

In FIGS. 5a to 5d, for the sake of simplicity, only the rotary plate 206 of the rotary table 201 and the mirror 5 are illustrated of the setup of rotary table and reference rotary table. The setup per se, however, is analogously to FIG. 4, having a reference rotary table which is arranged under the rotary table 201, i.e. as compared to FIG. 4, a rotary plate 61 of the reference rotary table and the markings 301, 302 and 303 are present in the setup of FIG. 5, but they are not designated in FIG. 5.

FIG. 5a illustrates the starting situation which corresponds to FIG. 4a. Furthermore illustrated is the measuring head 1209 of the coordinate-measuring machine 1211 (see FIG. 3) having a coupling element 1212. In FIG. 5b, the mirror 5, which has a coupling element which is not shown here, but will be explained in the following figures, is coupled to the coupling element 1212. The measuring head 1209 is displaced to the corresponding position which permits coupling of the mirror 5. Subsequently, the mirror 5 is lifted off the rotary plate 206 in the Z direction, which is illustrated schematically in FIG. 5b. The lifting per se is effected in the viewing direction of the viewer, that is to say towards the viewer. In the drawn illustration, this is illustrated with some distortion so as to illustrate the principle.

After the mirror 5 is separated from the rotary plate 206, the rotary plate 206 of the rotating apparatus 201 is rotated relative to the lifted mirror 5 about the rotation angle α, which is illustrated in FIG. 5c. Meanwhile, the mirror 5 remains coupled to the measuring head 1209. The rotation of the rotary plate 206 relative to the lifted mirror 5 is effected analogously as illustrated in FIG. 4c, i.e. the rotary plate 61 of the reference rotary table 60 is rotated by the angle α, as a result of which at the same time the rotary plate 206 is rotated.

In FIG. 5d, the mirror 5 is placed back on the rotary plate 206, by way of displacement of the measuring head 1209 in the Z direction. Subsequently, the mirror 5 is decoupled from the measuring head 1209 or the coupling element 1212, and the measuring head 1209 is removed again from the mirror 5. Starting from the situation shown in FIG. 5d, a second reversal measurement can be effected, as was explained previously on the basis of FIG. 4.

Instead of the shown sensor movement device, of which the measuring head 1209 is a part, it is also possible to use a different movement device for displacing a test element, wherein the principle of FIG. 4 or FIG. 5 is followed. Conceivable for example is a separate lifting and lowering apparatus, which can lift and lower the mirror according to the principle shown in FIG. 5, and which does not necessarily have to be a part of the coordinate-measuring machine 1211, but can be a separate apparatus which can be arranged in the measurement region of the CMM 1211.

The sequence of method steps illustrated schematically in FIG. 5 is shown in FIG. 6 on the basis of more concrete embodiments. FIG. 6a shows a concrete example of a rotary plate 206, on which a mirror 5 is arranged. The mirror 5 is connected to the coupling element 305, via which the mirror 5 is or can be coupled to the measuring head 1209, via the connecting element 304. FIG. 6a shows a decoupled state. The measuring head 1209, however, moves downward in the direction of the coupling element 305, illustrated by an arrow which is located next to the measuring head 1209 and points downwards.

The embodiment of FIG. 6 shows a measuring head 1209 of a CMM, which is capable of CNC change. The measuring ahead has the same reference sign as in FIG. 3, even though it is illustrated more schematically and slightly differently in FIG. 3.

Using a measuring head which is capable of CNC change as the lifting apparatus for the test element generally gives the following advantages, among others:

The three-point mounting of the plate 305 in the measuring head 1209 can ensure a repeatably exact alignment when placing down the mirror. Trials have shown that the mirror 5 can be placed down again without further optimization is in an accuracy range of less than 1 arc minute (less than $1/60°$). This can be increased further by further measures.

An ID chip can be structurally located in the plate of the coupling element 305. This ID chip can be read by the measuring head 1209. This opens the possibility to determine during an automatic measurement whether the correct mirror 5 was used, or whether a change to the correct mirror 5 was made. This minimizes the susceptibility to errors, for example if the mirror 5 is at one point not correctly coupled, and the reliability can be increased.

Using a coupling means 305, the mirror 5 can be placed into an already customary and available stylus change magazine, once it is no longer used after the measurement.

Due to the use of such a coupling means 305, the procedure is completely capable of being automated, among others because the coupling means 305 is a standardized coupling means. Despite automation, very high accuracy can be achieved.

FIG. 6b shows, analogously to FIG. 5b, how the mirror 5 is coupled to the measuring head 1209 and lifted. Disposed on the lower side is a coupling element on the measuring head, which is not visible here. This coupling element interacts together with the coupling element 305. A dot marking 306 is disposed on the rotary plate to illustrate the rotary position of the rotary plate 206.

FIG. 6c corresponds to FIG. 5c in terms of the method procedure. The rotary table plate 206 is rotated counter-clockwise about an angle α, which can be seen by way of the changed position of the marking 306. The rotation is illustrated with an arrow. The position 306' indicates the previous position of the marking.

FIG. 6d corresponds to FIG. 5d in terms of the method procedure. Starting from the situation illustrated in FIG. 6c, the mirror 5 was placed down on the rotary plate 206 after the rotation of the rotary plate 206, and the measuring head 1209 was decoupled from the coupling element 305 and moved up again.

FIG. 7 shows the test element 5 having the first coupling element in more detail. What can be seen is that the first coupling element 305 has a three-point mounting, having three rolls 306 arranged at an angle of 120°. Such coupling means are known from the coupling of styli to measuring heads. Disposed on the measuring head 1209 is a complementary coupling means.

FIGS. 8a to 8c shows a second coupling element 310, with which the test element 5, in this case a mirror, is coupled to the base or the first part 206 of the rotating apparatus 201. With this embodiment, a placement position of the mirror 5 on the rotary plate 206 which is more exact and stable for a measurement can be achieved. In the illustrated example, a cone-and-socket-connection is used, wherein the second coupling element 310 is embodied as a cone, and a complementary further coupling element 311, which is arranged on the rotary plate 206, is embodied as a socket. The coupling element 310 or the coupling element 311 can be made of a ferromagnetic substance for additionally establishing a magnetic coupling.

FIG. 8c shows the coupling of the test element 5 using the coupling elements 310, 311. The mirror 5 is placed in the cone socket 311 and, during measurement, that is to say in particular during the method steps S2 and S5, sits stably in the socket for conjoint rotation.

FIG. 8b shows, as an alternative to a rotary table, as a special embodiment of a rotating apparatus, a rotatable joint 312, which has a socket 311. The rotatable joint 312 has the rotation axis D2 (further rotation axes can be present). With a mirror 5 which is coupled thereto, it is possible to establish a measurement setup as is shown and explained in FIG. 12 in WO 2014/108187.

FIG. 9 shows a variant of the coupling according to FIG. 8. In this variant, a magnet 313 is attached in the cone socket 311 to produce additional magnetic coupling. Alternatively, the magnet 313 could be attached to the truncated cone 310. A permanent or electric magnet can be used, or a combination thereof. Electric compensation of a force of the permanent magnet is possible, when the test element 5 is intended to be removed.

Figure 10B:
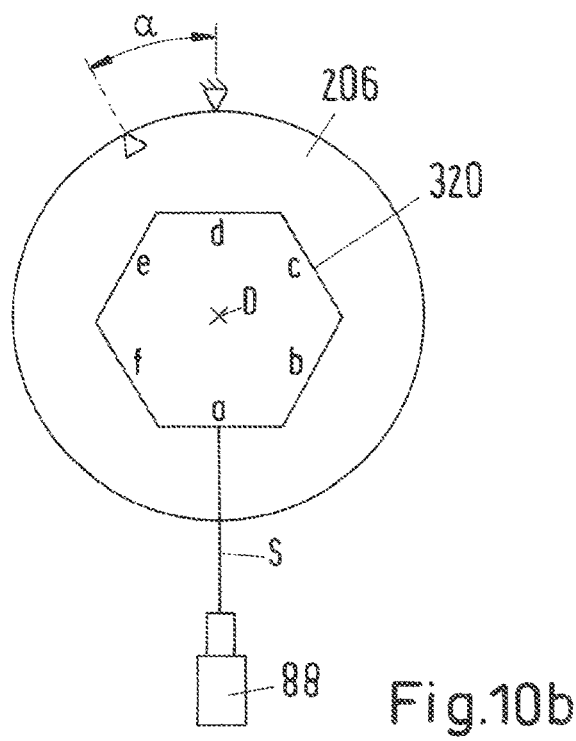

In FIGS. 10a and 10b, an alternative method for performing measurements using a test element 320 is illustrated. In this case, the test element 320 is a mirror polygon having the mirror surfaces a, b, c, d, e, f, in the form of a regular hexagon. The mirror surfaces a-f are perpendicular to the viewer. FIG. 10a is directed at the mirror surface a of the measurement beam S of the ACT 88. In the setup of FIG. 10, no reference rotary table 60 is present, which is used in the embodiments of FIGS. 4-6. Thus, only the rotary table 201 having the rotary plate 206 is used, which can be seen from above in this illustration.

In step S2 of the method, the following measurements are performed: The mirror surfaces a-f are moved successively into the measurement beam S by rotating the rotary plate 206 in clockwise fashion until they are perpendicular to the measurement beam S, which can be detected by the ACT. A corresponding angle rotation value is detected on the angle-measuring system of the rotary table 201, that is to say for example the rotation angle which is necessary, starting from the mirror surface a, to rotate the mirror surface b into the measurement beam S. The mirror surfaces a-f can of course also be measured in the reverse order, that is to say a, f, e, d, c, b.

At the end of the measurement cycle, the state of FIG. 10a is restored, in which the mirror surface a is located in the measurement beam S. Subsequently, the mirror polygon 320 is coupled to the measuring head 1209 and lifted off the rotary plate 206. For example, the mirror polygon 320 can be provided with a coupling means 305, as shown in FIG. 6. After the mirror polygon is lifted off, the rotary plate 206 is rotated counter-clockwise (or alternatively in clockwise fashion) about the angle α. Subsequently, the mirror polygon is placed with the measuring head 1209 back onto the rotary plate 206, and the measuring head 1209 is decoupled and moved upward. This gives the state shown in FIG. 10b, in which the mirror surface a is in the measurement beam S, but the rotary plate 206 is rotated by the angle α. Subsequently, the stated measurement sequence can be repeated, that is to say the mirror surfaces a-f can be rotated successively into the measurement beam S, and corresponding angle position or angle change values can be recorded with the angle-measuring system of the rotary table 201. Subsequently, the polygon 320 can be lifted again, the rotary plate 206 can be rotated by an angle again, the polygon can be placed down again, and a mother measurement cycle can be performed, etc.

The angle α can be chosen to be any desired angle, but preferably corresponds to a value of 360°/n, with n being an integer. However, n does not have to be identical to the number of mirror surfaces. The advantage also in this method is that a can be selected to be a small as desired, and using the sensor movement system of the CMM 1211, positioning or repositioning of the polygon 320 is possible with great accuracy.

After a performance of a plurality of new pose settings of the polygon 320 on the rotary plate 206 (FIG. 10a shows a first pose, FIG. 10b shows a second pose of the test element 320 on the rotating apparatus 201) and of the performance of a plurality of measurement cycles, as described above, the following are obtained:

angles of the polygon surfaces with respect to one another, such as angle a to b, angle b to c, angle d to e etc.

error of the rotary position measurement system of the rotary table 201.

The measurement principle explained on the basis of FIG. 10 is a self-calibration method, in which the angles of the mirror surfaces a-f with respect to one another do not need to be exactly known in advance. The error of the angle-measuring system of the rotary table 201, in particular the error of the scale, can be calculated directly from $n^2$ measurement locations. In addition, the angles of the polygon can be calculated retroactively using the thus obtained data via suitable evaluation. Such a method for ascertaining the error of the rotary position measurement system and for ascertaining the angles of the polygon is known per se and described for example in: Geckeler et al, Calibration of angle encoders using transfer functions, Measurement Science and Technology, 20061001 IOP, Bristol, G B, Vol:17, No: 10, Page(s):2811-2818 and in WO 2014/108187 A1.

What is claimed:

1. A method for performing measurements using a test element, comprising:
    arranging a test element on a first, rotatable part of a rotating apparatus, wherein the test element is arranged in a first pose relative to the first, rotatable part,
    performing a measurement by incorporating the test element in the first pose,
    arranging the test element on the first, rotatable part in a second pose relative to the first, rotatable part, with or using a movement device,
    performing a measurement by incorporating the test element in the second pose, and
    ascertaining an error of a rotary position ascertainment system of the rotating apparatus using the measurements by incorporation of the test element in the first and second poses.

2. The method according to claim 1, including the coupling of the test element to the movement device.

3. The method according to claim 2, wherein the coupling of the test element is to a measuring head of a coordinate-measuring apparatus.

4. The method according to claim 1, including the decoupling of the test element from the movement device.

5. The method according to claim 1, wherein the test element is a gauge block, a mirror, a mirror polygon, a probable calibration body or a calibration template.

6. The method according to claim 1, wherein the test element has a coupling element for coupling to the movement device.

7. The method according to claim 1, wherein the test element has a first coupling element, with which the test element is coupled to the first part of the rotating apparatus.

8. The method according to claim 7, wherein the first part of the rotating apparatus has a second coupling element, which interacts with the first coupling element.

9. The method according to claim 1, wherein the test element has an identification feature.

10. The method according to claim 1, wherein arranging of the test element includes, with or using the movement device in the second pose:
    lifting the test element, which is in the first pose, off the first part of the rotating apparatus using the movement device such that the test element and the first part are being separated from one another,
    rotating the first part of the rotating apparatus relative to the lifted-off test element by a rotation angle (a), and/or rotating and/or translationally moving the test element with the movement device, and
    placing the test element onto the first part such that the test element is arranged on the first part and in the second pose relative to the first part.

11. The method according to claim 1, wherein the rotating apparatus is coupled to a reference rotating apparatus and
    during the performance of the measurement by incorporating the test element, the rotating apparatus and the reference rotating apparatus are rotated in opposite directions,
    such that the pose of the test element in a machine coordinate system of a coordinate-measuring apparatus remains unchanged or is changed, and
    in the case of an unchanged pose of the test element, a rotary position value of a rotary position ascertainment system of the rotating apparatus and a rotary position value of a rotary position ascertainment system of the reference rotating apparatus are compared, and an error of the rotary position ascertainment system of the rotating apparatus is ascertained, or
    in the case of a changed pose of the test element, the change in the pose of the test element is ascertained, and thus the error of the rotary position ascertainment system of the rotating apparatus is ascertained.

12. The method according to claim 11, wherein a change in the pose of the test element, or an unchanged pose of the test element, is ascertained using an ascertainment device, which interacts with the test element.

13. The method according to claim 1, wherein the rotating apparatus is arranged within a measuring region of a coordinate-measuring apparatus.

14. The method according to claim 13, wherein the movement device is a sensor movement device of the coordinate-measuring apparatus.

15. The method according to claim 13, wherein the coordinate-measuring apparatus is a coordinate-measuring machine or a machine tool.

16. The method according to claim 13, including the coupling of the test element to the movement device.

17. The method according to claim 16, including the decoupling of the test element from the movement device.

18. The method according to claim 16, wherein the movement device comprises a gripping device with which the test element may be gripped, and the method comprises gripping of the test element with the movement device.

19. The method according to claim 1, wherein the movement device comprises a gripping device with which the test element may be gripped, and the method comprises gripping of the test element with the movement device.

* * * * *

UNITED STATES PATENT AND TRADEMARK OFFICE
CERTIFICATE OF CORRECTION

| | | |
|---|---|---|
| PATENT NO. | : 10,281,255 B2 | Page 1 of 1 |
| APPLICATION NO. | : 15/384985 | |
| DATED | : May 7, 2019 | |
| INVENTOR(S) | : Dominik Seitz et al. | |

It is certified that error appears in the above-identified patent and that said Letters Patent is hereby corrected as shown below:

In the Claims

<u>Column 22</u>
Line 2, Claim 10        delete "(a)" and insert --(α)--

Signed and Sealed this
Second Day of July, 2019

Andrei Iancu
*Director of the United States Patent and Trademark Office*